United States Patent Office

3,509,038
Patented Apr. 28, 1970

3,509,038
CHEMICAL TREATMENT OF AN ASPHALT FLUX
Luke W. Corbett, Mountainside, N.J., assignor to Esso Research and Engineering Company, a corporation of Delaware
No Drawing. Filed Mar. 14, 1967, Ser. No. 622,889
Int. Cl. C10c 3/02
U.S. Cl. 208—22                                    7 Claims

ABSTRACT OF THE DISCLOSURE

Petroleum residuum or asphalt flux is reacted at elevated temperatures with an aldehyde, a metal halide and a hydrogen abstracting agent such as chlorine gas, sulfuric acid, etc. The resultant asphaltic product is found to have the unusual combination of properties including a high softening point, excellent penetration characteristics and a low staining propensity.

BACKGROUND OF THE INVENTION

This invention relates to improved asphaltic products and the preparation thereof. More particularly, this invention concerns the treatment of petroleum residuum or asphalt flux with a hydrogen abstracting agent such as chlorine gas in the presence of a metal halide and an aldehyde in order to provide asphalts having high softening points together with excellent penetration and staining characteristics. Applications in which this unusual combination of properties is particularly desirable include the construction of canal linings and built-up roofs by the lamination of saturated felts with hot asphalt; the manufacture of asphalt shingles, roll roofing, siding, laminated papers and fabrics, insulation backing, asphalt tile and similar materials; and the preparation of caulking compounds, electrical insulating materials, water-proofing compounds, rubberized compositions and other formulations.

In the ordinary methods of refining petroleum, a large fraction is obtained as the residue from distillation of certain crude oils. This fraction generally is referred to as the residuum, or as it has also come to be known, asphalt flux. This latter terminology indicates the principal effectiveness of this fraction as a starting material in the preparation of asphalt. A number of techniques are known for producing asphalts of varying physical properties from asphalt flux. These include vacuum distillation, with or without the presence of steam, air blowing at elevated temperatures, and chemical treatment.

In general, the asphaltic compositions obtained by conventional processing methods do not have the combination of properties which are afforded by the compositions of this invention. For example, the hardness of an asphalt flux may be greatly increased by extensive steam or vacuum distillation, but the resulting product in this instance is generally more susceptible to temperature changes. The air blowing technique, in comparison with the vacuum distillation method, is capable of producing an asphalt product having improved temperature susceptibility characteristics but which is deficient in other properties such as ductility and penetration value. This "penetration value," which measures the consistency or hardness of bituminous material, is expressed as the distance that a standard needle penetrates vertically into a sample of the material under known conditions of loading, time, and temperature. These conditions generally are 100 grams, 5 seconds, and 25° C., respectively, and the units of penetration are expressed in tenths of a millimeter. This penetration value as used herein is determined according to the procedure of ASTM designation D5–65, "Standard Method of Test for Penetration of Bituminous Materials."

Similarly, the chemical treating methods used heretofore have produced asphaltic composition which are deficient in one or more important properties. For example, chemical treatment of asphalt flux with aldehydes and sulfonic acids (e.g., U.S. Patents 3,275,585 and 3,301,803) produces an asphaltic product having higher staining characteristics than the untreated or conventionally blown asphalt. Such increase in the staining characteristics is detrimental inasmuch as staining characteristics are of considerable importance in many applications of industrial asphalts. For example, asphalt is commonly used as a water proofing and damp proofing medium in the manufacture of packaging, building papers and fiber boards. In these applications, the asphalt is described as either a saturating or laminating asphalt in that it acts as a moisture barrier or as a binder between two or more layers of paper, fiber board or other flexible material. In some cases, it is a saturant since the paper or fiber material is immersed or dipped into the hot asphalt, while in other cases it is coated, in which case a surface film or layer of asphalt is caused to be deposited on one face of the flexible material. When asphalt has a high staining propensity, undesirable characteristics are imparted to the asphalt-treated paper or fiber board. This results in products that display an oily, blotchy or greasy surface, and therefore are very unsatisfactory for most applications. Thus, manufacturers desire and specify asphalts of low staining test properties. Also, in the manufacture of prepared roofing, coating asphalts of high staining properties impart a color discoloration to the mineral granules; this too is highly undesirable.

The staining characteristics are directly related to the Barber Stain Test. This is an empirical test which involves the placement of a sample of asphalt next to layers of a specified grade of cigarette paper. The test specimen is submitted to a given weight load at elevated temperature for a given period of time after which the stain number is determined by reading the number of papers that have actually been stained. In the Barber test, the stains will only be measured from one to eight with a number of four or less being specifically desirable depending upon the application.

SUMMARY OF THE INVENTION

In accordance with the invention, it has now been found that improved asphaltic compositions are prepared by means of a process which comprises reacting at a temperature within the range of from about 100° to about 350° C., preferably 175°–250° C., a mixture of:

(a) 100 parts by weight of a petroleum residuum or asphalt flux;
(b) from about 0.5 to about 10.0 parts by weight, preferably from 1–4 parts, of a hydrogen abstracting or activating agent;

(c) from about 0.1 to about 4.0 parts by weight, preferably from 0.2–1.0 part, of a metal halide catalyst; and
(d) from about 0.2 to about 10.0 parts by weight, preferably from 0.2–1.0 part, of an aldehyde coupling agent.

The petroleum residuum or asphalt flux utilized in the process of this invention may vary considerably depending upon the particular crude oil used, especially upon the geographic origin of the crude oil used. Thus, some crude stocks will yield much larger proportions of residuum than others, and the variation in chemical compositions of such residue likewise is considerable. The chemical identity of these residua, however, is not important with respect to the success of the process of this invention, and it is unnecessary to become concerned about the differences in such chemical identities. These residua are best defined in terms of softening point and flash point. As a practical matter, the residua are characterized by an ASTM softening point value of at least about 15° C., preferably within the range of from 25° to about 50° C., and a COC flash point above 400° F. Such limits define the range of commercially available straight run petroleum residua adapted for use in this process. Nonlimiting examples of residua suitably employed are derived from Lagunillas, Tia Juana, Boscan, Aramco, Talco, Kuwait, Oregon Basin, Lloydminister, Santa Maria, Kern River, Eucutta and Safanyia crudes, and the like.

The activating or hydrogen abstracting agent of this invention comprises those materials which abstract hydrogen from the petroleum residuum under the process conditions described herein. This agent is a compound selected from the group consisting of halogen gas, sulfur oxides, sulfur halides, sulfur oxyhalides, phosphorus oxides, phosphorus halides, phosphorus sulfides, phosphorus oxysulfides, organic anhydrides, sulfonic acids, and sulfuric acid. Specific examples of such activating agents include, among others, chlorine, bromine, sulfur trioxide, sulfuric acid, boron trifluoride, sulfur dichloride, sulfur monochloride, thionyl chloride, sulfur oxytetrachloride, phosphorus trichloride, phosphorus pentachloride, phosphorus thiochloride, phosphorus pentoxide, maleic anhydride, chlorosulfonic acid, toluene sulfonic acid, paratoluene sulfonic acid, and the like. It is preferred, however, to use chlorine, sulfur trioxide, thionyl chloride, and sulfuric acid. Mixtures of the foregoing may also, if desired, be used.

The catalyst component of this invention comprises a metal halide wherein the metal is aluminum, mercury, or a metal of the first transition series of the Periodic Table, i.e., Ti, V, Cr, Mn, Fe, Co, Ni, Cu and Zn. Suitably employed metal halides include, among others, zinc chloride, zinc bromide, ferric chloride, ferric bromide, aluminum chloride, mercuric chloride, aluminum bromide, vanadium trichloride, titanium trichloride, cupric bromide, cuprous chloride, manganese chloride, and the like. It is preferred, however, to use zinc chloride or ferric chloride.

The coupling agent of this invention comprises, in general, any compound containing the monovalent radical characteristic of aldehydes. These compounds include the saturated and unsaturated aliphatic and aromatic mono and poly aldehydes, including heterocyclic aldehydes. Nonlimiting examples of suitably employed aldehydes include formaldehyde, acetaldehyde, butyraldehyde, valeraldehyde, acrolein, crotonaldehyde, propionaldehyde, succinicaldehydes, adipaldehyde, benzaldehyde, tolualdehyde, salicylaldehyde, furfuraldehyde, trioxane, paraformaldehyde, mixtures thereof, and the like. It is preferred, however, to use paraformaldehyde.

All of the above-mentioned compounds effect, to some degree, chemical modification of the petroleum residuum. It is believed that a type of condensation-polymerization takes place when the petroleum residuum is chemically treated in accordance with the invention set forth herein. For example, the reactive type agents such as the gaseous halogens, sulfur trioxide, sulfuric acid, etc., will react almost immediately with the residuum forming some asphaltenes. With respect to the polynuclear molecules contained within the residua, it appears that halogenation, or sulfonation etc. takes place predominantly at the alpha positions thereby forming substitution products. These products, however, are not heat stable but are subject to deactivation (electron withdrawing) thereby leaving a reactive functional group. Thus, to some degree, the activating agents of this invention promote condensation type reactions to take place. It has been found, however, that the condensation-polymerization type reaction may be more effectively induced by providing additional halide type ions, i.e., from inorganic salts as zinc chloride, ferric chloride, aluminum chloride, etc. As will be shown herein later, the condensation-polymerization reaction may be further enhanced by providing a coupling agent which will provide a hydrocarbon linkage between the reactive sites of different aromatic molecules. The aldehydes are found to perform this function. As will be supported hereinlater by data, the asphaltic product with the most desirabel properties will result only when the activating agent, catalyst and coupling agent of this invention are used together in combination with the petroleum residua or asphalt flux.

Ordinarily, the process of this invention is carried out by first mixing the catalyst, coupling agent, and the residuum, heating such mixture to attain an intimate blend of the components, and then adding the activating agent portionwise. However, no criticality in the order of addition of the various reactants has been observed. In general, the superior asphaltic products of this invention may be produced by reacting the aforedescribed mixture at elevated temperatures for a period varying from a few minutes, e.g., 2 minutes to as much as several hours or more, e.g., 3 hours. It is preferred, however, to employ a reaction time varying from about 10 minutes to about 1 hour. The reaction can also be carried out at superatmospheric pressures. When such elevated pressures are employed, higher temperatures and shorter reaction times can also be employed.

The following examples are presented to illustrate specific modes of carrying out the process of the present invention. They are given for purposes of illustration only and are not to be construed as limiting the scope of the invention, except as the latter is defined by the appended claims. Unless otherwise stated, all parts and percentages are by weight and are based on the weight of the petroleum residuum or asphalt flux employed.

DESCRIPTION OF THE PREFERRED EMBODIMENTS

The following examples serve to illustrate the preparation of the improved asphaltic compositions of the present invention, and to demonstrate the criticality of the presence of all of the components of the aforedescribed process.

EXAMPLE 1

A series of runs were made in which a Lagunillas straight reduced petroleum flux having a softening point of about 40° C. was chemically treated with various chemical compounds, including those of the present invention. In this example, the nongaseous reactants and the flux were combined at room temperature and thereafter heated with stirring at 182° C. for a period of about 10 minutes. In the instances where a gaseous reactant was used, e.g., chlorine, the nongaseous reactants and/or the flux were heated to 182° C. whereupon the gaseous reactant was added at a constant rate at said elevated temperature for a period of about 10 minutes. For comparison purposes, the flux of this example was also air-blown at 245° C. for a period of about 7 hours as illustrated in run A. All other runs were at 182° C.

for a period of 10 minutes. The results were as shown in Table I.

TABLE I

| Run | Chemical agents used in treatment of flux | Product evaluation | | |
|---|---|---|---|---|
| | | °F. softening point [1] | Penetration [2] | Barber stain [3] |
| A | Air-blowing | 205 | 12 | 2½ |
| B | 5% chlorine | 125 | 67 | |
| C | 5% chlorine+0.5% paraformaldehyde | 158 | 35 | 4 |
| D | 5% chlorine+0.5% paraformaldehyde+0.5% ferric chloride | 184 | 26 | 2 |
| E | 0.5% paraformaldehyde+0.5% zinc chloride | 143 | 48 | 2 |
| F | 3.0% chlorine+0.5% zinc chloride | 168 | 32 | 2 |
| G | 3.0% chlorine+0.5% paraformaldehyde+0.5% zinc chloride | 202 | 24 | 3 |
| H | 3.5% chlorine+0.5% paraformaldehyde+0.5% zinc chloride | 209 | 22 | 3 |

[1] ASTM D36-64T.
[2] ASTM D5-65.
[3] I. & E. Chem. (An. Ed.) 9, 563 (1937).

As will be apparent from an examination of the comparative data presented in Table I, the most desirable properties, i.e., excellent softening point and penetration characteristics, were attained only when all three of the components of this invention were present during the treatment of the petroleum flux. In other words, the maximum improvement in asphaltic properties was obtained from runs D, G and H where the flux was heated in the presence of the aforedescribed activating agent, catalyst and coupling agent.

EXAMPLE 2

To show the advantage of the process of this invention over the air-blowing technique and other chemical treatment methods (e.g., U.S. Patent 3,275,585), Barber Stain test comparisons were made on samples which were prepared in the same manner as that described in the previous example with the exception that the flux was heated in the presence of the compounds defined in the following table for a period of about 1 hour. In addition, the flux employed in this example, i.e., a straight reduced Lagunillas flux having a softening point of about 29° C., was airblown at 245° C. for a period of 6.5 hours in order to obtain a product for roofing-type applications. As is generally known, an asphaltic product of 4 or less Barber stain is universally specified for both roofing and paper treatment applications. The comparative results are shown below in Table II.

TABLE II

| Run | Chemical Agents Used in Treatment of Flux | Product evaluation | | | |
|---|---|---|---|---|---|
| | | °F., softening point [1] | Penetration [2] | Penetration index [3] | Barber stain |
| A | Air-blowing | 210 | 16 | 4.0 | 3 |
| B | 0.5% paraformaldehyde+0.5% zinc chloride+3.5% chlorine | 206 | 35 | 5.3 | 3½ |
| C | 0.9% paraformaldehyde+3.0% sulfuric acid | 221 | 32 | 5.8 | 5½ |
| D | 10% furfural+1.0% sulfuric acid | 201 | 55 | 6.0 | 6 |
| E | 1.0% furfural+1.0% p-toluene sulfonic acid | 134 | 72 | 1.0 | 4½ |

[1] ASTM D36-64T.
[2] ASTM D5-65.
[3] Pfeiffer and van Doormal, J.Inst.Pet. 22, 414 (1936).

The above data clearly show that the process of this invention (run B) yields a product which is superior to air-blowing asphaltic products (run A) in terms of temperature susceptibility and superior to other chemically treated asphalts (runs C–E) in terms of staining characteristics. Thus, by the practice of this invention, it is possible to prepare an asphalt having low staining properties in combination with a high softening point and excellent temperature susceptibility as indicated by the penetration index.

It is not intended that this invention be limited to the specific examples presented by way of illustration. The scope of the invention is limited only by the appended claims.

What is claimed is:

1. A process for preparing an improved asphaltic composition which consists essentially of reacting at a temperature within the range of from about 100° to about 350° C., a mixture of:
   (a) 100 parts by weight of an asphalt-containing petroleum residuum;
   (b) from about 0.5 to about 10.0 parts by weight of a compound selected from the group consisting of halogen gas, sulfur oxides, sulfur halides, sulfur oxyhalides, phosphorus oxides, phosphorus halides, phosphorus sulfides, phosphorus oxysulfides, acid anhydrides, sulfonic acids, sulfuric acid and mixtures thereof;
   (c) from about 0.1 to about 4.0 parts by weight of a metal halide wherein said metal is aluminum or mercury or a member of the first transition series of the Periodic Table; and
   (d) from about 0.2 to about 10.0 parts by weight of an aldehyde.

2. The process of claim 1 wherein component (b) is selected from the group consisting of chlorine, sulfur trioxide, thionyl chloride, sulfuric acid, and mixtures thereof.

3. The process of claim 2 wherein component (c) is selected from the group consisting of zinc chloride, ferric chloride, and mixtures thereof.

4. The process of claim 3 wherein component (d) is paraformaldehyde.

5. A process for preparing an improved asphaltic composition which consists essentially of reacting at a temperature within the range of from about 175° C. to about 250° C., a mixture of:
   (a) 100 parts by weight of an asphalt-containing petroleum residuum;
   (b) from about 0.5 to about 10.0 parts by weight of chlorine;
   (c) from about 0.1 to about 4.0 parts by weight of zinc chloride; and
   (d) from about 0.2 to about 10.0 parts of paraformaldehyde.

6. A process for preparing an improved asphaltic composition which consists essentially of:
   (a) preparing a mixture comprising 100 parts by weight of an asphalt-containing petroleum residuum, from about .2 to about 1.0 part by weight of zinc chloride and from about 0.2 to about 1.0 part by weight of paraformaldehyde;
   (b) heating said mixture at a temperature within the range between about 175° and 250° C. for a period of time ranging from about 10 to about 60 minutes; and (c) adding to said mixture at said elevated temperature from about 1 to about 4 parts by weight of chlorine.

7. The composition produced by the process of claim 1.

References Cited

UNITED STATES PATENTS 2,764,523  9/1956  Cottle et al. _____ 208—22
3,004,862  10/1961  Winslow _____ 208—6
3,152,978  10/1964  Fierce et al. _____ 208—44

HERBERT LEVINE, Primary Examiner

U.S. Cl. X.R.

208—44; 106—273, 274, 279